US011163456B2

(12) United States Patent
McBride et al.

(10) Patent No.: US 11,163,456 B2
(45) Date of Patent: Nov. 2, 2021

(54) USING MIRROR INDICATORS TO DETERMINE WHETHER TO MIRROR TRACKS IN A DATA SET IN A PRIMARY VOLUME MIRRORED TO A SECONDARY VOLUME

(71) Applicant: INTERNATIONAL BUSINESS MACHINES CORPORATION, Armonk, NY (US)

(72) Inventors: Gregory E. McBride, Vail, AZ (US); Dash D. Miller, St. Louis Park, MN (US); Miguel A. Perez, Tucson, AZ (US); David C. Reed, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/352,818

(22) Filed: Mar. 13, 2019

(65) Prior Publication Data
US 2019/0212926 A1 Jul. 11, 2019

Related U.S. Application Data

(63) Continuation of application No. 15/635,093, filed on Jun. 27, 2017, now Pat. No. 10,318,190, which is a
(Continued)

(51) Int. Cl.
G06F 3/06 (2006.01)
G06F 11/14 (2006.01)
(Continued)

(52) U.S. Cl.
CPC ............ G06F 3/0619 (2013.01); G06F 3/065 (2013.01); G06F 3/067 (2013.01); G06F 3/0665 (2013.01);
(Continued)

(58) Field of Classification Search
CPC ......... G06F 3/0619; G06F 3/065; G06F 3/067
(Continued)

(56) References Cited

U.S. PATENT DOCUMENTS 7,100,072 B2    8/2006   Galipeau et al.
7,146,475 B2   12/2006   Perego
(Continued)

OTHER PUBLICATIONS

B. Dufrasne, et al. "IBM z/OS Global Mirror Planning, Operations, and Best Practices", IBM Corporation, RedPaper, document REDP-4878-00, Oct. 2013, pp. 116.
(Continued)

Primary Examiner — Than Nguyen
(74) Attorney, Agent, or Firm — Konrad Raynes Davda & Victor LLP; David W. Victor

(57) ABSTRACT

Provided are a computer program product, system, and method for using mirror indicators to determine whether to mirror tracks in a data set in a primary volume mirrored to a secondary volume. A table is read. The table is maintained by a primary controller managing the primary volume that includes a mirror indicator for each of a plurality of tracks in at least one data set configured in the primary volume indicating whether a track is to be mirrored to the secondary volume. Record sets are read from a cache of the primary controller for the tracks in primary volume having the mirror indicators in the table indicating that the track is to be mirrored. The write data in the read record sets is applied to tracks in the secondary volume mirroring the tracks in the primary volume.

19 Claims, 7 Drawing Sheets

Related U.S. Application Data continuation of application No. 15/276,458, filed on Sep. 26, 2016, now Pat. No. 9,753,662.

(51) Int. Cl.
    *G06F 12/0868*     (2016.01)
    *G06F 11/20*     (2006.01)

(52) U.S. Cl.
    CPC ...... *G06F 11/1446* (2013.01); *G06F 11/1448* (2013.01); *G06F 11/2069* (2013.01); *G06F 11/2071* (2013.01); *G06F 12/0868* (2013.01); *G06F 2212/154* (2013.01); *G06F 2212/286* (2013.01); *G06F 2212/312* (2013.01)

(58) Field of Classification Search
    USPC .......................................................... 711/162
    See application file for complete search history.

(56) References Cited

U.S. PATENT DOCUMENTS

| | | | |
|---|---|---|---|
| 7,467,168 | B2 | 12/2008 | Kern et al. |
| 9,753,645 | B1 | 9/2017 | McBride et al. |
| 9,753,662 | B1 | 9/2017 | McBride et al. |
| 10,318,190 | B2* | 6/2019 | McBride ............ G06F 11/1446 |
| 10,379,740 | B2 | 8/2019 | McBride et al. |
| 2004/0073831 | A1* | 4/2004 | Yanai ................... G06F 3/0689 |
| | | | 714/6.32 |
| 2004/0181640 | A1 | 9/2004 | Factor et al. |
| 2004/0260736 | A1 | 12/2004 | Kern et al. |
| 2006/0015946 | A1 | 1/2006 | Yagawa |
| 2007/0156983 | A1* | 7/2007 | Kern ................... G06F 11/2064 |
| | | | 711/162 |
| 2009/0249116 | A1 | 10/2009 | Bartfai et al. |
| 2010/0228998 | A1 | 9/2010 | Yagawa et al. |
| 2014/0108717 | A1 | 4/2014 | Tian et al. |
| 2014/0108756 | A1 | 4/2014 | Brown et al. |
| 2015/0301906 | A1 | 10/2015 | Crockett et al. |
| 2017/0046232 | A1 | 2/2017 | Cadarette et al. |
| 2018/0088817 | A1 | 3/2018 | McBride et al. |
| 2018/0088842 | A1 | 3/2018 | McBride et al. |
| 2019/0294337 | A1* | 9/2019 | McBride ............. G06F 11/2082 |

OTHER PUBLICATIONS

U.S. Appl. No. 15/276,484, filed Sep. 26, 2016.
Office Action dated Dec. 13, 2016, pp. 12, for U.S. Appl. No. 15/276,484, filed Sep. 26, 2016.
Response dated Mar. 13, 2016, pp. 9, to Office Action dated Dec. 13, 2016, pp. 12, for U.S. Appl. No. 15/276,484, filed Sep. 26, 2016.
Notice of Allowance dated Apr. 27, 2017, pp. 9, for U.S. Appl. No. 15/276,484, filed Sep. 26, 2016.
U.S. Appl. No. 15/641,041, filed Jul. 3, 2017.
Final Office Action dated Dec. 12, 2017, pp. 15, for U.S. Appl. No. 15/641,041, filed Jul. 3, 2017.
Response dated Feb. 12, 2018, pp. 8, to Final Office Action dated Dec. 12, 2017, pp. 15, for U.S. Appl. No. 15/641,041, filed Jul. 3, 2017.
Office Action dated Mar. 19, 2018, pp. 11, for U.S. Appl. No. 15/641,041, filed Jul. 3, 2017.
Response dated Jun. 19, 2018, pp. 11, to Office Action dated Mar. 19, 2018, pp. 11, for U.S. Appl. No. 15/641,041, filed Jul. 3, 2017.
Notice of Allowance dated Aug. 31, 2018, pp. 17, for U.S. Appl. No. 15/641,041.
Office Action dated Oct. 26, 2018, pp. 9, for U.S. Appl. No. 15/641,041.
Response dated Nov. 8, 2018, pp. 7, to Office Action dated Oct. 26, 2018, pp. 9, for U.S. Appl. No. 15/641,041.
Final Office Action dated Jan. 18, 2019, pp. 15, for U.S. Appl. No. 15/641,041, filed Jul. 3, 2017.
U.S. Appl. No. 15/276,458, filed Sep. 26, 2016.
Office Action dated Dec. 12, 2016, pp. 13, for U.S. Appl. No. 15/276,458, filed Sep. 26, 2016.
Response dated Mar. 13, 2017, pp. 8, to Office Action dated Dec. 12, 2016, pp. 13, for U.S. Appl. No. 15/276,458, filed Sep. 26, 2016.
Notice of Allowance dated Apr. 25, 2017, pp. 11, for U.S. Appl. No. 15/276,458, filed Sep. 26, 2016.
U.S. Appl. No. 15/635,093, filed Jun. 27, 2017.
Final Office Action dated Dec. 7, 2017, pp. 16, for U.S. Appl. No. 15/635,093, filed Jun. 27, 2017.
Response dated Feb. 12, 2018, pp. 10, to Final Office Action dated Dec. 7, 2017, pp. 16, for U.S. Appl. No. 15/635,093, filed Jun. 27, 2017.
Office Action dated Apr. 4, 2018, pp. 17, for U.S. Appl. No. 15/635,093, filed Jun. 27, 2017.
Response dated Jul. 5, 2018, pp. 13, to Office Action dated Apr. 4, 2018, pp. 17, for U.S. Appl. No. 15/635,093.
Final Office Action dated Sep. 14, 2018, pp. 13, for U.S. Appl. No. 15/635,093.
Response dated Dec. 14, 2018, pp. 8, to Final Office Action dated Sep. 14, 2018, pp. 13, for U.S. Appl. No. 15/635,093.
Notice of Allowance dated Jan. 23, 2019, pp. 12, for U.S. Appl. No. 15/635,093.
List of IBM Patents and Applications Treated as Related, dated Mar. 13, 2019, pp. 2.
Response dated Mar. 18, 2019, pp. 7, to Final Office Action dated Jan. 18, 2019, pp. 15, for U.S. Appl. No. 15/641,041.
Notice of Allowance dated Apr. 4, 2019, pp. 12, for U.S. Appl. No. 15/641,041.
U.S. Appl. No. 16/436,915, filed Jun. 10, 2019.
Preliminary Amendment dated Jun. 10, 2019, pp. 7, for U.S. Appl. No. 16/436,915, filed Jun. 10, 2019.
List of IBM Patents and Applications Treated as Related, dated Apr. 20, 2020, pp. 2.
Office Action dated Jun. 23, 2020, pp. 22, for U.S. Appl. No. 16/436,915.
Response dated Sep. 23, 2020, pp. 10, to Office Action dated Jun. 23, 2020, pp. 22, for U.S. Appl. No. 16/436,915.
Final Office Action dated Nov. 5, 2020, pp. 8, for U.S. Appl. No. 16/436,915.
Response dated Dec. 27, 2020, pp. 8, to Final Office Action dated Nov. 5, 2020, pp. 8, for U.S. Appl. No. 16/436,915.
Notice of Allowance dated Jan. 13, 2021, pp. 12, for U.S. Appl. No. 16/436,915.
Notice of Allowance dated Mar. 25, 2021, pp. 12, for U.S. Appl. No. 16/436,915.

\* cited by examiner

USING MIRROR INDICATORS TO DETERMINE WHETHER TO MIRROR TRACKS IN A DATA SET IN A PRIMARY VOLUME MIRRORED TO A SECONDARY VOLUME

BACKGROUND OF THE INVENTION

1. Field of the Invention

The present invention relates to a computer program product, system, and method for using mirror indicators to determine whether to mirror tracks in a data set in a primary volume mirrored to a secondary volume.

2. Description of the Related Art

In certain computing environments, multiple host systems may configure data sets in volumes configured in a storage system, such as interconnected storage devices, e.g., a Direct Access Storage Device (DASD), Redundant Array of Independent Disks (RAID), Just a Bunch of Disks (JBOD), etc. Data sets are comprised of extents, which may comprise any grouping of tracks and data storage units. The Z/OS® operating system from International Business Machines Corporation ("IBM") has a Volume Table of Contents (VTOC) to provide information on data sets of extents configured in the volume, where the VTOC indicates the location of tracks, extents, and data sets for a volume in storage.

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy. In data mirroring systems, data is maintained in volume pairs. A volume pair is comprised of a volume in a primary storage device and a corresponding volume in a secondary storage device that includes an identical copy of the data maintained in the primary volume. Primary and secondary control units, also known as storage controllers or enterprise storage servers, may be used to control access to the primary and secondary storage devices. In peer-to-peer remote copy operations (PPRC), multiple primary control units may have source/target pairs, i.e., volume pairs, included in consistency groups so that data copied to target volumes by the different primary control units maintains data consistency.

When establishing a mirror copy relationship, the administrator may set up copy relationship between volumes in a session that may be grouped according to Logical Subsystem (LSS), where there may be multiple LSSs, each grouping multiple volumes, and where the LSSs are assigned to one session. Data consistency may be maintained among the mirror copy operations between the volumes in the LSSs assigned to a session.

There is a need in the art for improved techniques for controlling data mirroring operations.

SUMMARY

Provided are a computer program product, system, and method for using mirror indicators to determine whether to mirror tracks in a data set in a primary volume mirrored to a secondary volume. A table is read. The table is maintained by a primary controller managing the primary volume that includes a mirror indicator for each of a plurality of tracks in at least one data set configured in the primary volume indicating whether a track is to be mirrored to the secondary volume. Record sets are read from a cache of the primary controller for the tracks in primary volume having the mirror indicators in the table indicating that the track is to be mirrored. The write data in the read record sets is applied to tracks in the secondary volume mirroring the tracks in the primary volume

DETAILED DESCRIPTION

Data mirror products are designed to copy full volumes from a primary to a secondary site. However, the customer may not want to copy certain data sets or tracks within a data set, and copying a full volume would move non-essential data sets prior to initiating the data mirror. Described embodiments allow a user to specify data sets and tracks in a data set to mirror in a user data set mirror list that is used to generate a reference table to indicate which data sets and tracks in a primary volume are mirrored, so that only those indicated data sets and tracks are mirrored. A data set mover at the secondary site may use the reference table to determine which tracks or record sets in the primary controller cache to copy to the secondary volume in the mirror copy relationship. This allows the user to specify with fine grain control data sets and tracks within a data set to include in the mirror copy.

Figure 1:
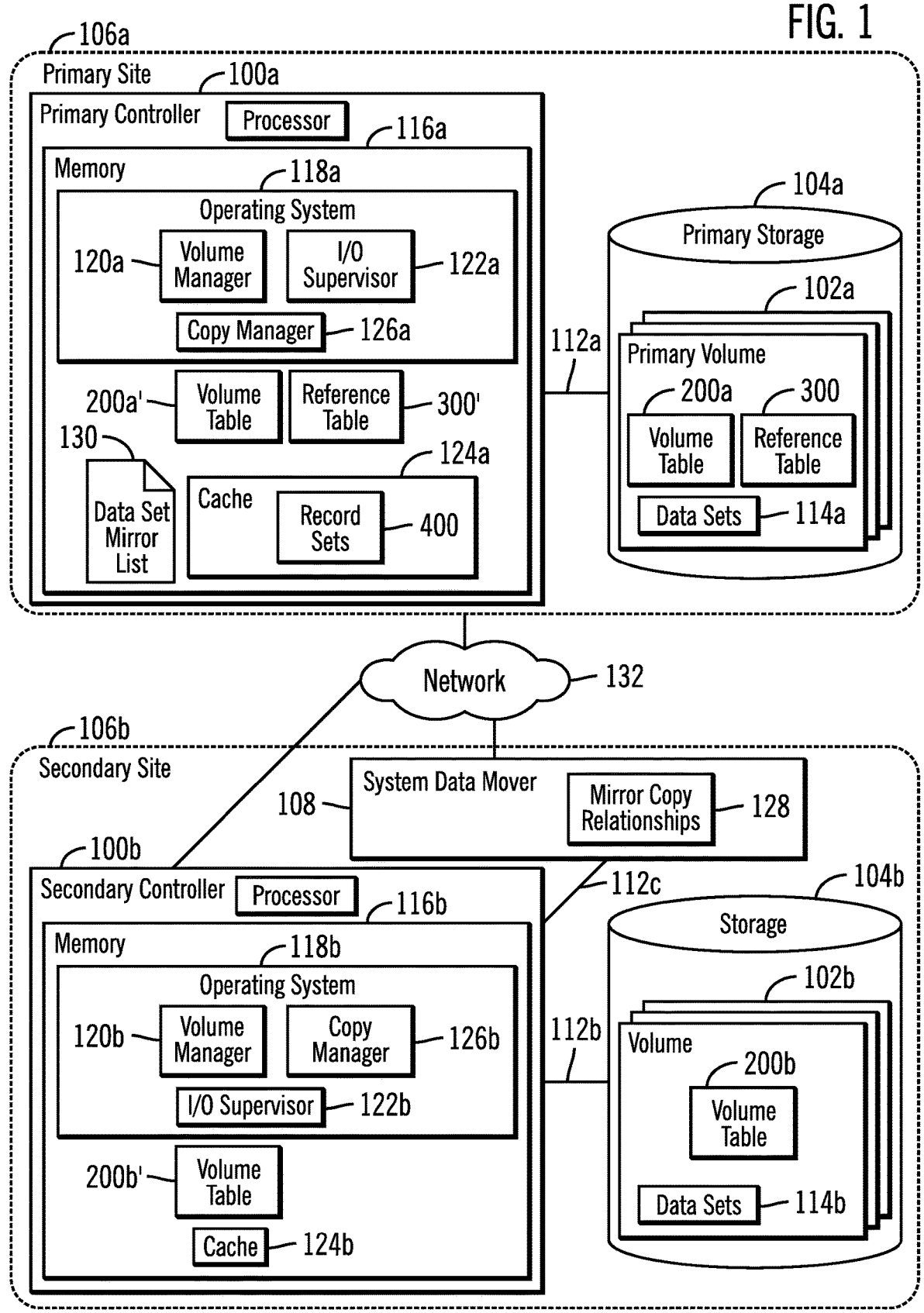
FIG. 1 illustrates an embodiment of a mirror copy storage environment.

FIG. 1 illustrates an embodiment of a mirror copy computing environment having a primary controller 100*a* managing access to primary volumes 102*a* in a primary storage 104*a* at a primary site 106*a*. A system data mover 108 may manage the mirroring of data in the primary volumes 102*a* to secondary volumes 102*b* in a secondary storage 104*b* managed by a secondary controller 100*b* at a secondary site 106*b*. The system data mover 108 and primary controller 100*a* communicate over a network 110. The primary 100*a* and secondary 100*b* controllers communicate with the storages 104a, 104b, respectively, over connections 112a, 112b and the system data mover 108 may connect to the secondary controller 100b over connection 112c. The connections 112a, 112b, 112c may comprise a direct connection line, a network, wireless connection, etc. In further embodiments, the system data mover 108 may be implemented in the secondary controller 100b or a separate virtual or hardware system.

The controllers 100a, 100b manage access to data sets 114a, 114b configured in the primary 102a and secondary 102b volumes, respectively. A data set 114a, 114b comprises a collection of data intended to be stored in a same logical allocation of data, such as data from a single application, user, enterprise, etc. A data set 114a, 114b may be comprised of separate files or records, or comprise a single file or record. Each record or file in the data set may be comprised of extents of data. The data sets 114a, 114b may comprise indexed data sets that are indexed according to a primary key that is used to locate records in the data set 114a, 114b or unindexed.

The primary 106a and secondary 106b sites may be at remote or proximate geographical locations, such as in a same building, same city, same state, same country, different countries, or any other regional, national, nautical, or planetary boundaries, etc.

The primary 100a and secondary 100b controllers each include a system memory 116a, 116b including an operating system 118a, 118b having a volume manager 120a, 120b to manage the storage of data sets 114a, 114b in the volumes 102a, 102b. The operating system 118a, 118b may comprise an operating such as the IBM z/OS® operating system or other operating systems. (IBM and z/OS are trademarks of IBM worldwide).

Each volume 102a, 102b includes a volume table 200a, 200b having information on the volume 104 to which it pertains, including a mapping of tracks and extents of tracks to data sets 102. The volume table 200a, 200b may be stored in the volume 102a, 102b, such as in the first few records of the volume, i.e., starting at the first track in the volume 104. In IBM z/OS operating system implementations, the volume table 200a, 200b may comprise a volume table of contents (VTOC). The volume tables 200a, 200b may comprise contiguous space data set having contiguous tracks or physical addresses in the storages 104a, 104b. In alternative embodiments, the volume table 200a, 200b may comprise a file allocation table stored separately from the volume 102a, 102b.

The controllers 100a, 100b may maintain copies of the volume tables 200a, 200b to use to manage the data sets 114a, 114b in the volumes 200a', 200b' in their respective memory 116a, 116b. In z/OS implementations, the volume table 200a, 200b, e.g., VTOC, may include information on locations of data sets 114a, 114b in the volumes 102a, 102b, such as a mapping of extents in the data set to storage locations in the volume. In alternative embodiments, the volume tables 200a, 200b may comprise other types of file allocation data structures that provide a mapping of data to storage locations, either logical and/or physical storage locations. In this way, the volume table 200a, 200b provides a mapping of tracks or extents to data sets 1114a, 114b in the volumes 102a, 102b. In further embodiments, the volume tables 200a, 200b may include a volume name (VOLSER) and data set records indicating data sets having extents configured in the volume 104. Each data set record in a volume table may have information for each data set 102 in a volume 104, including the one or more extents assigned to the data set 102. The data sets 114a, 114b may be variable size data sets or fixed sized data sets.

The operating systems 118a, 118b further include an Input/Output supervisor 122a, 122b comprising a driver to manage the disk caching and access operations for the volumes 102a, 102b configured in the primary 104a and secondary 104b storages, respectively. Further the I/O supervisor 122a may manage the storage of record sets 400 in a cache 124a to cache data for the primary volumes 102a. The secondary controller 100b has a cache 124b to cache data for the secondary volumes 102b. The operating system 118a, 118b may further include a copy manager 126a, 126b to manage mirror copy operations between the primary 100a and secondary 100b controllers. The system data mover 108 would further have information on mirror copy relationships 128 established between the primary volumes 102a and secondary volumes 102b, which may be created by the copy manager 126a. The I/O supervisor 122a creates record sets 400 in the cache 124b for track data to mirror to the secondary volume 102b.

The volume manager 120a may further generate a reference table 300 to provide fine grain control on which tracks in data sets 114a are to be mirrored to the secondary volume 102b to allow for only a subset of tracks in the data sets 114a to be mirrored to the secondary volume 102b. The reference table 300 may be stored at contiguous physical locations in the primary storage 104a with respect to the volume table 200a in the primary volume 102a, such as an extension of the volume table 200a. A copy of the reference table 300' may be maintained in the memory 116a.

The copy manager 126a or other component may receive a data set mirror list 130 from a user indicating for a primary volume 102a in a mirror copy relationship 128 the data sets 114a and tracks within data sets to include in the mirror copy. The reference table 300 is generated based on the data set mirror list 130 from a user or administrator to indicate the data sets or tracks that are to be mirrored to the secondary volume 102b.

The storages 104a, 104b may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), Non-Volatile Dual In-line Memory Module (NVDIMM), Static Random Access Memory (SRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storages 104a, 104b may comprise heterogeneous storage devices from different vendors or from the same vendor.

The memory 116a, 116b may comprise suitable volatile or non-volatile memory devices for a system or main memory, including those memory class devices described above with respect to the storages 104a, 104b.

The primary controller 100a, secondary controller 100b, and system data mover 108 may communicate over a network 132, such as a Local Area Network (LAN), Storage Area Network (SAN), Wide Area Network (WAN), peer-to-peer network, wireless network, etc. Alternatively, the connection 114 may comprise bus interfaces, such as a Peripheral Component Interconnect (PCI) bus or serial interface.

Figure 2:
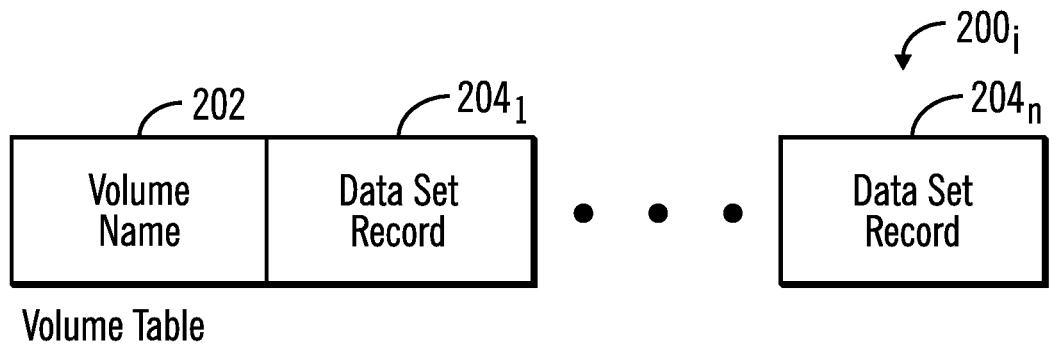
FIG. 2 illustrates an embodiment of a volume table entry.

FIG. 2 illustrates an arrangement of information maintained in an instance of a volume table $200_i$ for one volume $102a$, $102b$. The volume table instance $200_i$ includes a volume name 202, also known as a volume serial number, e.g., a VOLSER, that provides a unique identifier of the volume. The volume name 202 may be included in the name of the volume table $200_i$ in the volume $104_i$. The volume table $200_i$ instance further includes one or more data set records $204_1 \ldots 204_n$ indicating data sets having extents configured in the volumes $102a$, $102b$ represented by the volume table $200_i$. The volume table $200_i$ may further include additional metadata on the volume $102a$, $102b$ configuration.

Figure 3:
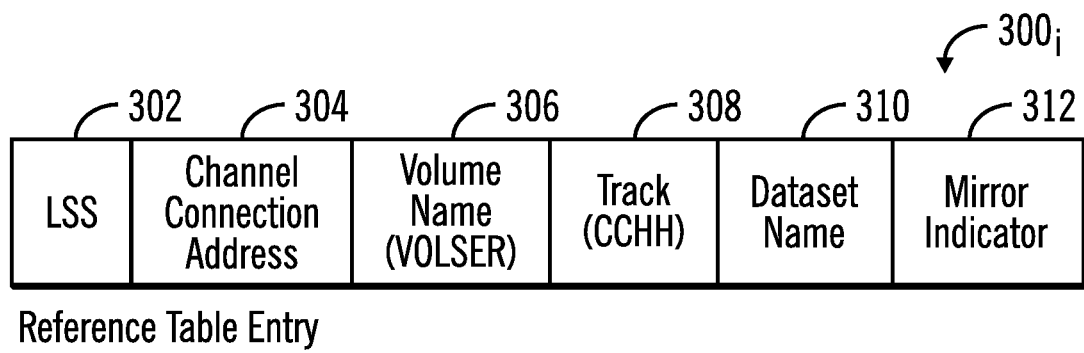
FIG. 3 illustrates an embodiment of a reference table entry.

FIG. 3 illustrates an embodiment of a reference table entry $300i$ in the reference table 300 for each track configured in a volume $102a$, and includes a logical subsystem (LSS) 302 including the track, comprising logical functions of a storage controller that allow one or more host I/O interfaces to access a set of devices; a channel connection address (CCA) 304, which comprises an I/O address that uniquely identifies an I/O device to the channel during an I/O operation; a volume name 306, such as a volume serial number (VOLSER); a track identifier 308, such as a, cylinder number (CC) and head number (HH); a data set name 310 of the data set including the track 308; and a mirror indicator 312 indicating whether the track 308 is to be mirrored to the secondary volume $102b$.

Figure 4:
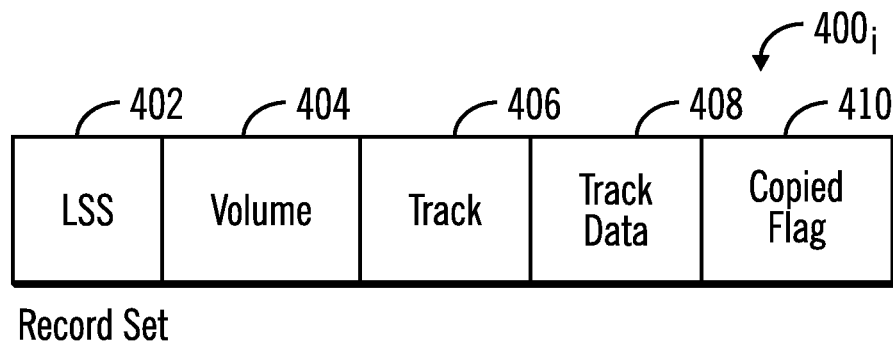
FIG. 4 illustrates an embodiment of a record set.

FIG. 4 illustrates an embodiment of a record set $400_i$ instance, including the LSS 402, volume 404, and track identifier 406 of a track, track data 408, such as write data, and a copied flag 410 indicating whether the record set $400_i$ was copied. The copied flag 410 may be implemented in the hardware of the cache $124a$, such as in the cache line.

Figure 5:
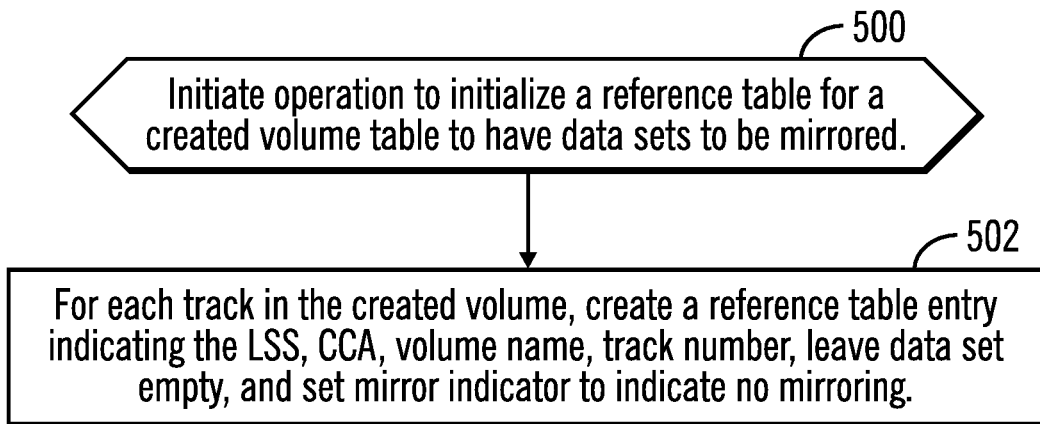
FIG. 5 illustrates an embodiment of operations to generate a reference table.

FIG. 5 illustrates an embodiment of operations performed by the volume manager $120a$ to generate a reference table 300 for the volume table $200a$, which may be created when the volume $102a$ is configured in the primary storage $104a$. Upon initiating (at block 500) the operation to initialize the reference table 300, the volume manager 120 for each track in the created volume, creates (at block 502) a reference table entry 300, indicating the LSS 302, channel connection address (CCA), volume name 306, and track number 308, leaves the data set name 310 empty, and sets the mirror indicator to indicate no mirroring. In this way, the track is assigned to the volume 306 but not yet allocated for use or mirroring.

When creating a reference table for a mirror copy that will perform an initial full copy of the primary volume $102a$, the data set name 310 and mirror indicators 312 for all the tracks may be set to indicate copying to cause the system data mover 108 to perform a full copy of the entire primary volume $102a$ to the secondary volume $102b$.

Figure 6:
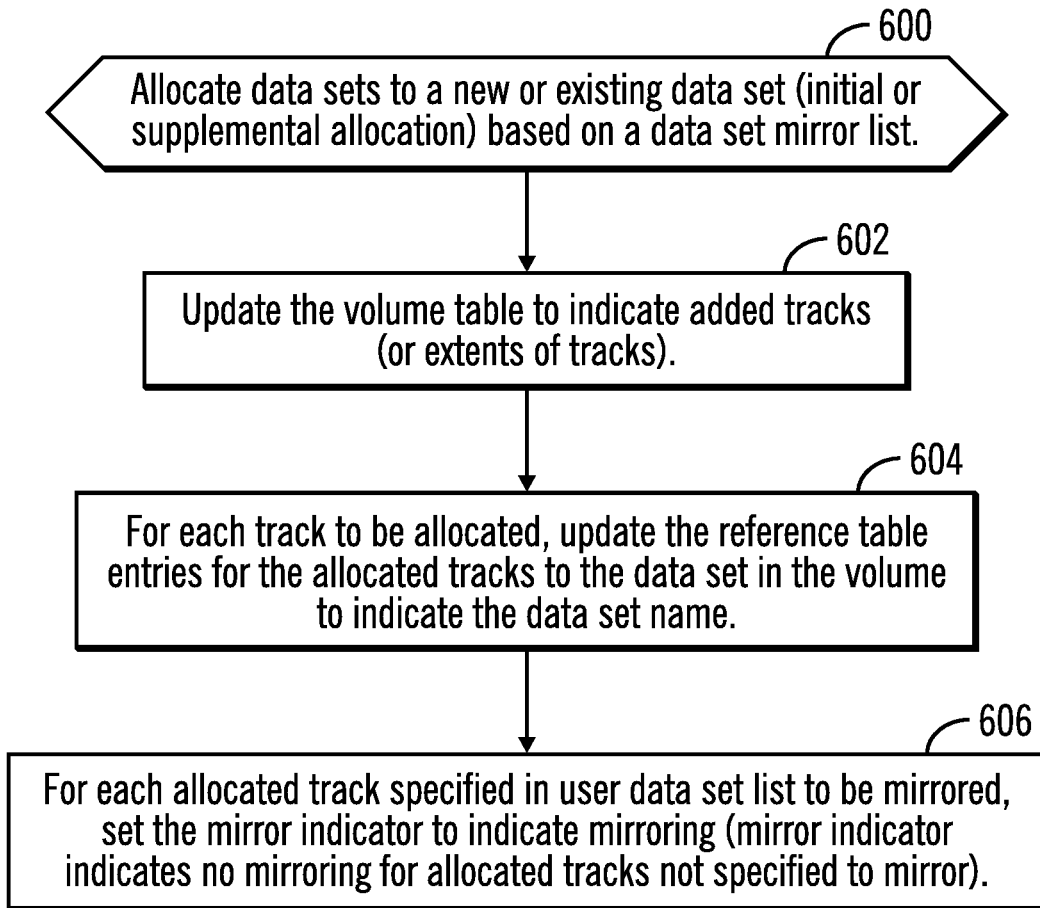
FIG. 6 illustrates an embodiment of operations to update the reference table when allocating tracks to a data set in a mirror volume.

FIG. 6 illustrates an embodiment of operations performed by the volume manager $120a$ to allocate a data set and tracks to a data set, in an initial or supplemental allocation, based on a data set mirror list 130 provided by a user to indicate which data sets and tracks to subject to mirroring. Upon allocating one or more data sets and tracks (at block 600), the volume manager $120a$ updates (at block 602) the volume table $200a$ to indicate the added data sets, tracks, or extents of tracks. For each track in a data set being allocated, the volume manager $120a$ updates (at block 604) the reference table entries $300_i$ for the allocated tracks in the volume 306 to indicate the data set name in which the track is allocated in field 310. For each allocated track specified in a received user data set list to be mirrored, set (at block 606) the mirror indicator 312 to indicate mirroring. The mirror indicator 312 indicates no mirroring for allocated tracks not specified to mirror. The data set mirror list 130 may specify individual tracks of a data set $114a$ to mirror or may specify to mirror all tracks in a data set $114a$. The allocation may be of an entire data set $114a$ or to add tracks to an existing data set $114a$.

In certain embodiments, the user specified data set mirror list 130 may indicate to mirror tracks including metadata and configuration information for a volume, including the volume table $200a$, reference table 300, and other configuration information for a volume $102a$. This ensures mirror copy protection of critical system files and information.

Figure 7:
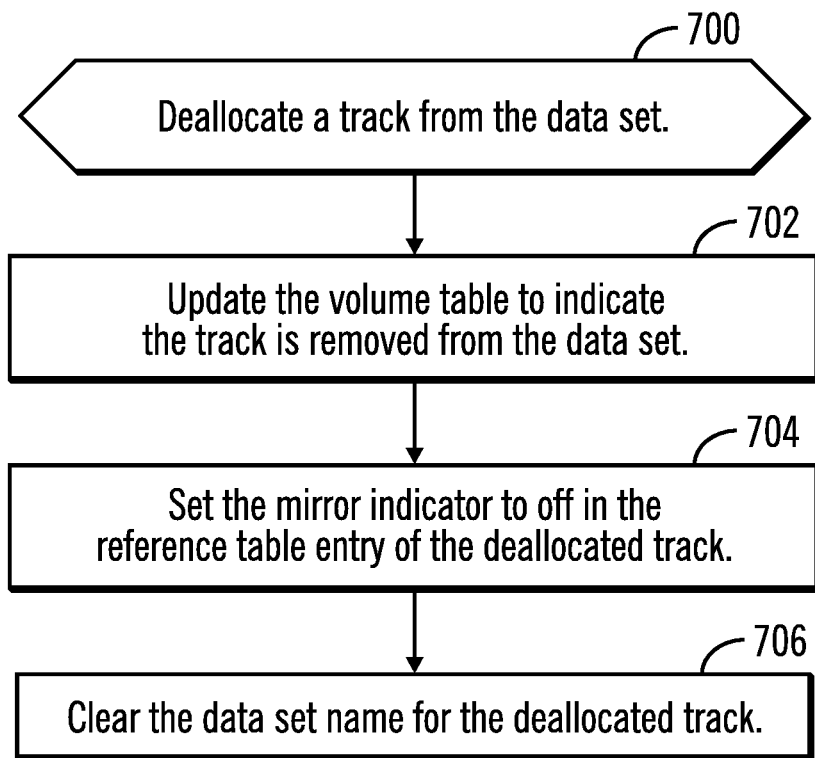
FIG. 7 illustrates an embodiment of operations to update the reference table when deallocating a track from a data set.

FIG. 7 illustrates an embodiment of operations performed by the volume manager $120a$ to deallocate or remove a data set $114a$ or track in a data set $114a$ from the primary volume $102a$. Upon deallocating (at block 700) a data set or track in a data set, the volume manager $120a$ updates (at block 702) the volume table $200a$ to indicate the track is removed from the data set. The mirror indicator 312 is set (at block 704) to indicate no mirroring in the reference table entry $300_i$ for the deallocated track and the data set name 310 for the track 308 being deallocated is cleared (at block 706). This setting of the mirror indicator 312 and clearing of the data set name 310 will cause the secondary controller $100b$ to remove data for the track from the mirrored secondary volume $102b$. The deallocation may involve deallocating an entire data set $114a$ and all tracks therein or to deallocate or remove specific tracks from a data set $114a$.

Figure 8:
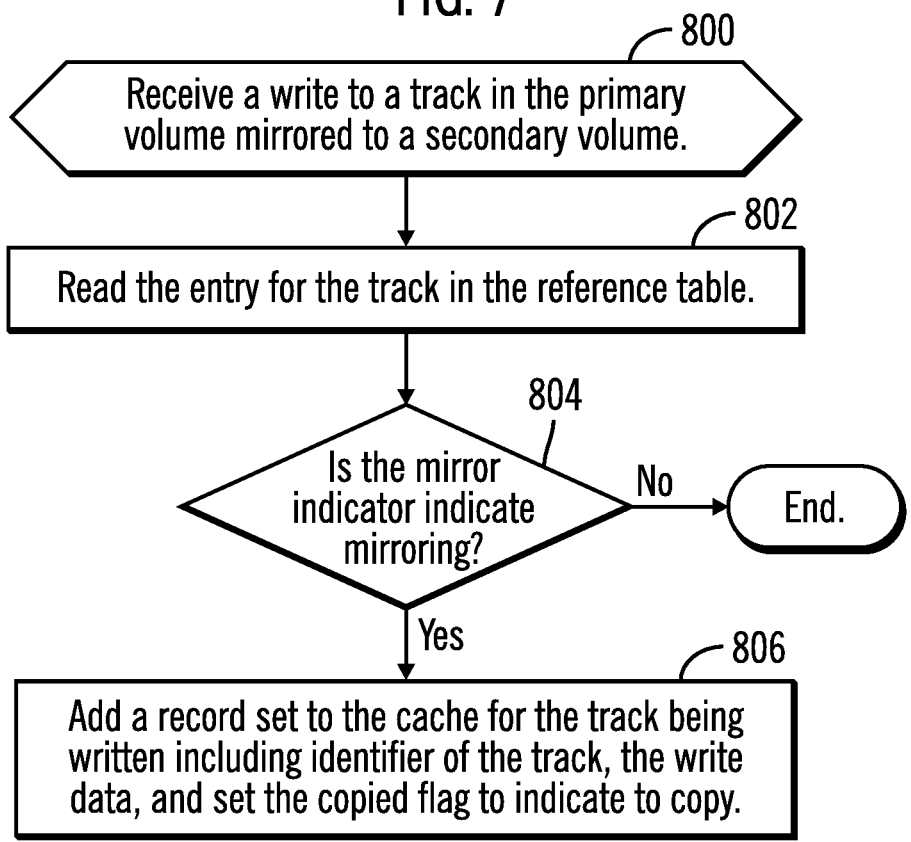
FIG. 8 illustrates an embodiment of operations to process a write to a track in the mirrored primary volume.

FIG. 8 illustrates an embodiment of operations performed by the I/O supervisor $122a$ to process a write to a track in a primary volume $102a$ that is mirrored to a secondary volume $102b$. Upon receiving (at block 800) the write, the I/O supervisor $122a$ reads (at block 802) the entry $300_i$ for the written track in the reference table 300. If (at block 804) the mirror indicator 312 for the updated track indicates mirroring, then the I/O supervisor $122a$ adds (at block 806) a record set $400_i$ to the cache $124a$ for the updated track including the LSS 402, volume 404, track identifier 406, the write data 408 for the track; and sets the copied flag 410 to indicate that the track data has not been copied.

Figure 9:
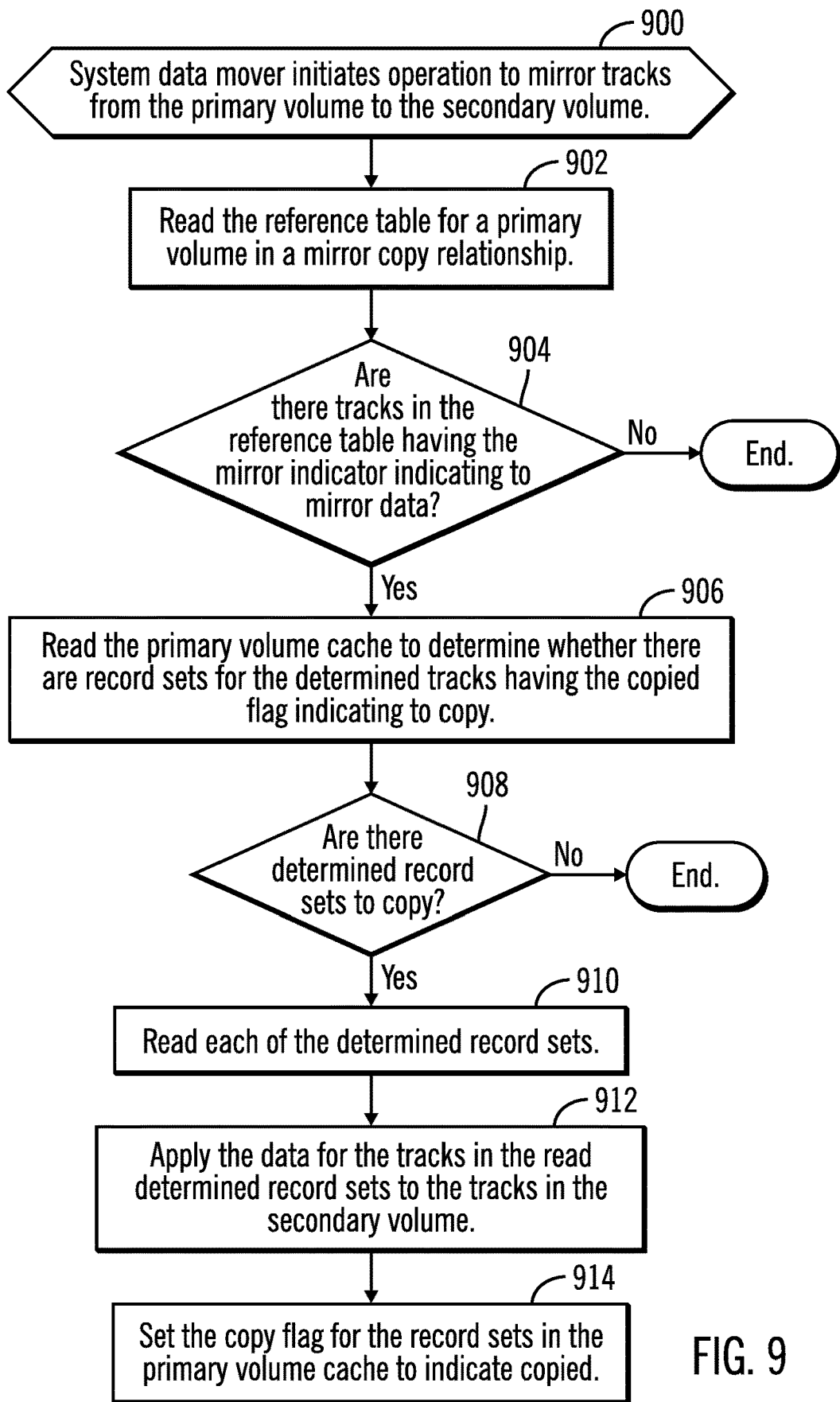
FIG. 9 illustrates an embodiment of operations to mirror tracks from the primary volume to the secondary volume.

FIG. 9 illustrates an embodiment of operations performed by the system data mover 108 to mirror tracks in record sets 400 in the primary cache $124a$ to the secondary volume $102a$. Upon initiating (at block 900) the operation to mirror data, the system data mover 108 reads (at block 902) the reference table 300 for a primary volume $102a$ in a mirror copy relationship 128. If (at block 904) there are tracks in the reference table 300 having the mirror indicator 312 indicating to mirror data, then the system data mover 108 reads (at block 906) the primary volume $102a$ cache $124a$ to determine whether there are record sets 400 for the determined tracks to mirror having the copied flag 410 indicating the record set $400_i$ has not yet been copied. If (at block 908) there are determined record sets 400 to copy, then the system data mover 108 reads (at block 910) each of the determined record sets $400_i$ having an LSS 402 and volume 404 for the primary volume $102a$ in the mirror copy relationship 128 and applies (at block 912) the data for the tracks in the read determined record sets 400 to the corresponding tracks in the mirrored secondary volume $102b$ in the mirror copy relationship 128. The copied flag 410 in the read record set $400_i$ in the cache $124a$ is set (at block 914) to indicate the record set $400_i$ has been copied.

If (at block 904) there are no tracks in the reference table 300 having the mirror indicator 312 indicating to mirror data or if (at block 908) there are no record sets $400_i$ to copy, i.e., having the copied flag 410 indicating already copied, then control ends without reading and mirroring data.

With the described embodiments, the system data mover 108 only mirrors the record sets 400 in the cache 124a that are indicated to be mirrored in the mirror indicator 312 of the reference table entry $300_i$ for the track being considered. Tracks or record sets that are not indicated to be mirrored are then left in the cache 124a and not mirrored. This allows for fine-grain control of the tracks of a primary volume 102a in a mirror copy relationship 128 that will be subject to mirroring, so that only those tracks of a data set 114a are specified to be mirrored are mirrored, and tracks in a data set 114a in a volume 102a to mirror that have not been specified to mirror will not be mirrored to store in the secondary storage 104b.

Figure 10:
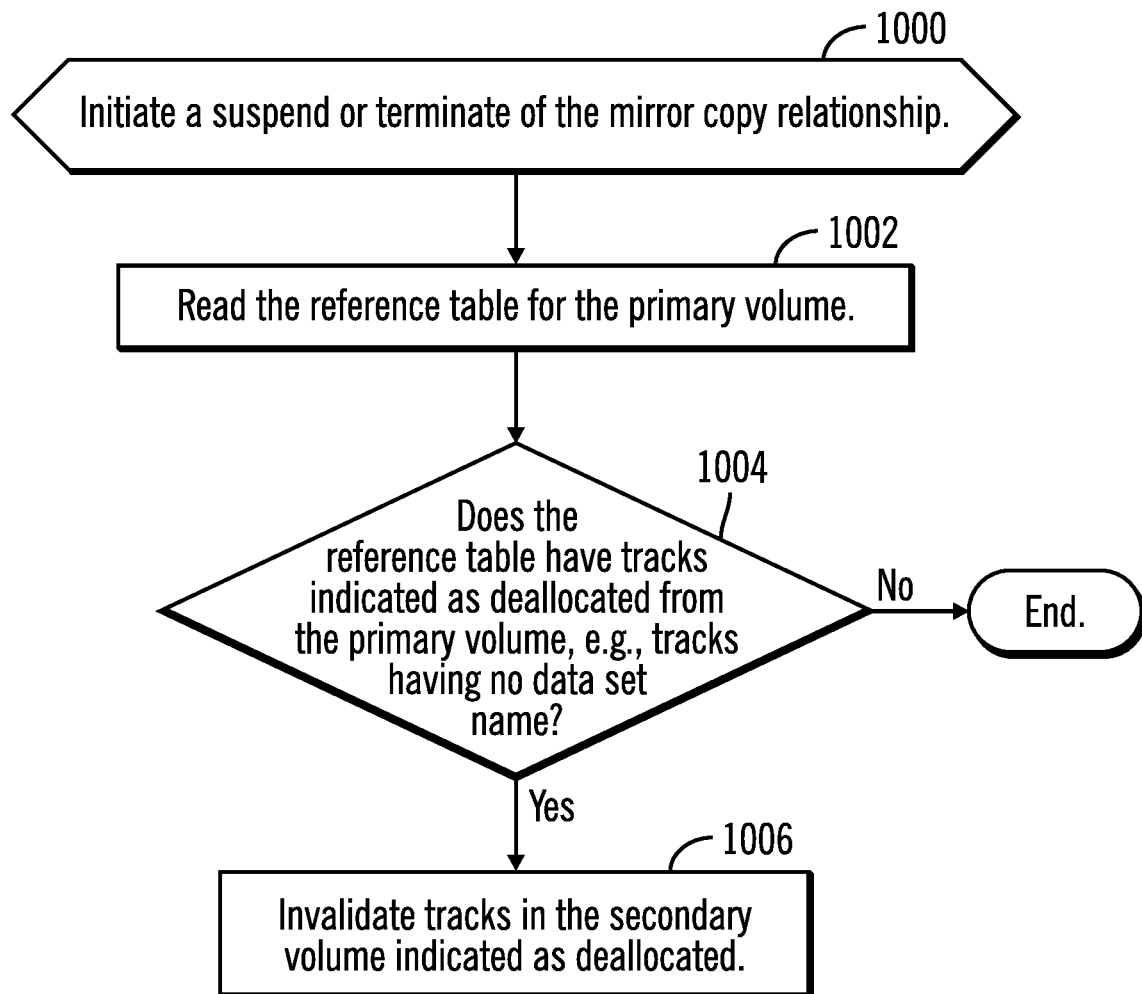
FIG. 10 illustrates an embodiment of operations to process a suspend or terminate of the mirror copy relationship.

FIG. 10 illustrates an embodiment of operations performed by the system data mover 108 to process a suspend or terminate of a mirror copy relationship 128. Upon initiating (at block 1000) the suspension or termination of a mirror copy relationship 128 for a primary 102a and secondary 102b volumes, the system data mover 108 reads (at block 1002) the reference table 300 for the primary volume 1002. If (at block 1004) the reference table 300 has entries with tracks 308 indicated as deleted from the primary volume 102a, which is indicated by the entry 300, having no data set name 310, then the system data mover 108 invalidates (at block 1006) tracks/data sets in the secondary volume indicated as deleted, such as by writing all 0s to the track.

With the embodiment of FIG. 10, once a mirror copy relationship 128 is suspended or terminated, the secondary volume 102b mirror copy is made consistent with the current state of the primary volume 102a being mirrored by removing tracks/data sets from the secondary volume 102b removed from the primary volume 102a.

Figure 11:
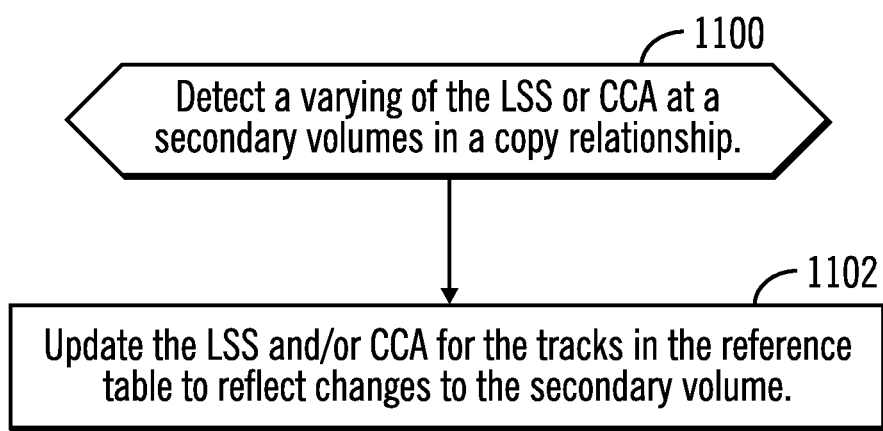
FIG. 11 illustrates an embodiment of operations to update changes to the reference table.

FIG. 11 illustrates an embodiment of operations performed by the volume manager 120a or 120b upon detecting changes to the configuration and/or addressing at the secondary volume 102b, such as a change in the logical subsystem or channel connect address. Upon detecting (at block 1100) a change to the configuration and/or addressing, the fields 302 and/or 304 in the entries $300_i$ of the reference table 300 are updated to reflect the changes, so that the system data mover 108 can determine from the updated reference table 300 the secondary volume 102a locations to be updated with the updated track data.

In FIGS. 3-8, operations described as performed by the volume manager 120a and the I/O supervisor 122a may be performed all or in part by another component. In FIGS. 9-10, operations described as performed by the system data mover 108 may be performed all or in part by another component, such as the copy manager 126a.

The reference characters used herein, such as i and n used herein to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
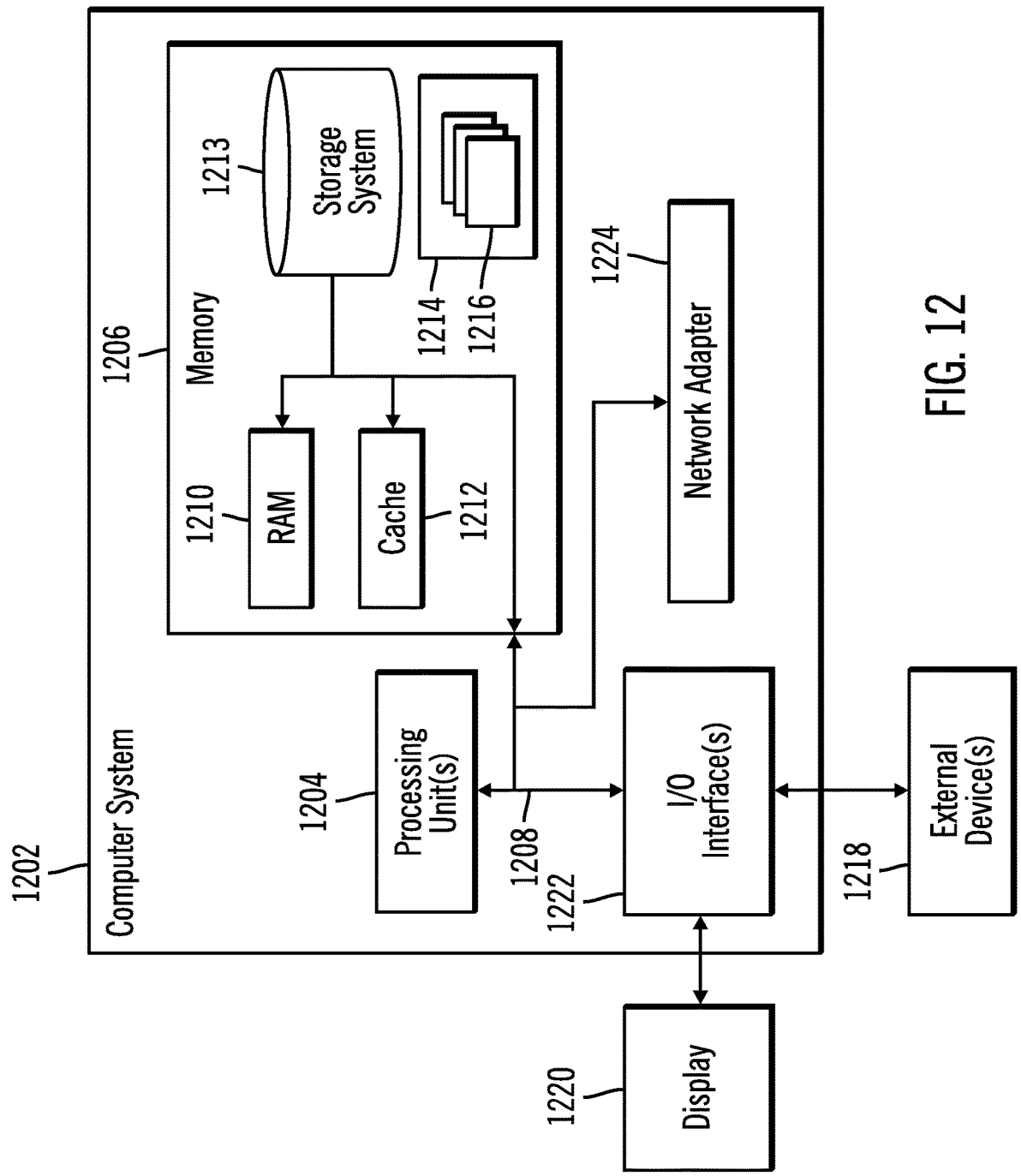
FIG. 12 illustrates a computing environment in which the components of FIG. 1 may be implemented.

The computational components of FIG. 1, including the controllers 100a, 100b, and system data mover 108 may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for mirroring data between a primary volume managed by a primary controller having a cache and a secondary volume, wherein the computer program product comprises a computer readable storage medium having program instructions embodied therewith, the program instructions executable by a processor to cause operations, the operations comprising:

in response to an allocation of at least one data set to the primary volume, updating a table to indicate allocated tracks in the at least one data set allocated to the primary volume and, for each allocated track of the allocated tracks indicated in the table that is specified to be mirrored to the secondary volume, setting a mirror indicator indicating that the allocated track is to be mirrored to the secondary volume, wherein less than all of the allocated tracks indicated in the table are specified to be mirrored to the secondary volume;

reading record sets from the cache of the primary controller for tracks in the primary volume having mirror indicators indicating that the tracks are to be mirrored; and applying write data in the read record sets to tracks in the secondary volume mirroring the tracks in the primary volume according to mirror indicators for the tracks.

2. The computer program product of claim 1, wherein the table comprises a reference table, further comprising:

in response to configuring the primary volume in a primary storage, initializing the reference table including an entry for each track in a data set in the primary volume including the mirror indicator for the track; and setting the mirror indicator in each entry to indicate no mirroring for the track in the entry in response to initializing the reference table.

3. The computer program product of claim 1, wherein the operations further comprise:

determining, from the table, at least one track that is indicated as being deallocated from the primary volume; and invalidating the determined at least one track indicated as being deallocated from the primary volume.

4. The computer program product of claim 3, wherein the invalidating the determined at least one track in the secondary volume is performed in response to an operation suspending a mirror copy between the primary volume and the secondary volume.

5. The computer program product of claim 1, wherein the primary volume and the cache are at a primary site, wherein the secondary volume is at a secondary site, wherein a system data mover at the secondary site reads the table, reads the record sets from the cache, and applies the write data in the read record sets to the tracks in the secondary volume for which the record sets provide data.

6. The computer program product of claim 1, wherein the table comprises a reference table stored next to a volume table in the primary volume, wherein the volume table provides information on data sets and tracks allocated in the primary volume and the mirror indicators for data sets and tracks indicated in the primary volume.

7. The computer program product of claim 1, wherein the table indicates a logical subsystem and a device address for each of the tracks in the at least one data set, wherein the operations further comprise:

determining at least one data set and the tracks having the logical subsystem and device address configured in the primary volume that were modified; and updating at least one of the logical subsystem and the device address in the table for each of the determined at least one data set and the tracks to reflect current settings for the at least one of the logical subsystem and the device address.

8. A system in communication with a primary controller, having a cache, managing access to a primary volume mirrored to a secondary volume, comprising:
a processor;
a computer readable storage medium having program instructions that when executed by a processor performs operations, the operations comprising:
in response to an allocation of at least one data set to the primary volume, updating a table to indicate allocated tracks in the at least one data set allocated to the primary volume and, for each allocated track of the allocated tracks indicated in the table that is specified to be mirrored to the secondary volume, setting a mirror indicator indicating that the allocated track is to be mirrored to the secondary volume, wherein less than all of the allocated tracks indicated in the table are specified to be mirrored to the secondary volume;
reading record sets from the cache of the primary controller for tracks in the primary volume having mirror indicators indicating that the tracks are to be mirrored; and
applying write data in the read record sets to tracks in the secondary volume mirroring the tracks in the primary volume according to mirror indicators for the tracks.

9. The system of claim 8, wherein the table comprises a reference table, further comprising:
in response to configuring the primary volume in a primary storage, initializing the reference table including an entry for each track in a data set in the primary volume including the mirror indicator for the track; and
setting the mirror indicator in each entry to indicate no mirroring for the track in the entry in response to initializing the reference table.

10. The system of claim 8, wherein the operations further comprise:
determining, from the table, at least one track that is indicated as being deallocated from the primary volume; and
invalidating the determined at least one track indicated as being deallocated from the primary volume.

11. The system of claim 10, wherein the invalidating the determined at least one track in the secondary volume is performed in response to an operation suspending a mirror copy between the primary volume and the secondary volume.

12. The system of claim 8, wherein the primary volume and the cache are at a primary site, wherein the secondary volume is at a secondary site, wherein a system data mover at the secondary site reads the table, reads the record sets from the cache, and applies the write data in the read record sets to the tracks in the secondary volume for which the record sets provide data.

13. The system of claim 8, wherein the table indicates a logical subsystem and a device address for each of the tracks in the at least one data set, wherein the operations further comprise:
determining at least one data set and the tracks having the logical subsystem and device address configured in the primary volume that were modified; and
updating at least one of the logical subsystem and the device address in the table for each of the determined at least one data set and the tracks to reflect current settings for the at least one of the logical subsystem and the device address.

14. A method for mirroring data between a primary volume and a secondary volume, comprising:
in response to an allocation of at least one data set to the primary volume, updating a table to indicate allocated tracks in the at least one data set allocated to the primary volume and, for each allocated track of the allocated tracks indicated in the table that is specified to be mirrored to the secondary volume, setting a mirror indicator indicating that the allocated track is to be mirrored to the secondary volume, wherein less than all of the allocated tracks indicated in the table are specified to be mirrored to the secondary volume;
reading record sets from a cache for tracks in the primary volume having mirror indicators indicating that the tracks are to be mirrored; and
applying write data in the read record sets to tracks in the secondary volume mirroring the tracks in the primary volume according to mirror indicators for the tracks.

15. The method of claim 14, wherein the table comprises a reference table, further comprising:
in response to configuring the primary volume in a primary storage, initializing the reference table including an entry for each track in a data set in the primary volume including the mirror indicator for the track; and
setting the mirror indicator in each entry to indicate no mirroring for the track in the entry in response to initializing the reference table.

16. The method of claim 14, further comprising:
determining, from the table, at least one track that is indicated as being deallocated from the primary volume; and
invalidating the determined at least one track indicated as being deallocated from the primary volume.

17. The method of claim 16, wherein the invalidating the determined at least one track in the secondary volume is performed in response to an operation suspending a mirror copy between the primary volume and the secondary volume.

18. The method of claim 14, wherein the primary volume and the cache are at a primary site, wherein the secondary volume is at a secondary site, wherein a system data mover at the secondary site reads the table, reads the record sets from the cache, and applies the write data in the read record sets to the tracks in the secondary volume for which the record sets provide data.

19. The method of claim 14, wherein the table indicates a logical subsystem and a device address for each of the tracks in the at least one data set, further comprising:
determining at least one data set and the tracks having the logical subsystem and device address configured in the primary volume that were modified; and
updating at least one of the logical subsystem and the device address in the table for each of the determined at least one data set and the tracks to reflect current settings for the at least one of the logical subsystem and the device address.

* * * * *